United States Patent [19]

Hua

[11] Patent Number: 5,595,376
[45] Date of Patent: Jan. 21, 1997

[54] MANDREL FOR PROCESSING A WORKPIECE WITH AN INTERNAL SPLINE

[76] Inventor: Xu X. Hua, Tiexi Qu, Fugong Er Jie, 6-223, Shenyang City 110024, China

[21] Appl. No.: 193,504

[22] Filed: Feb. 7, 1994

[30] Foreign Application Priority Data

Feb. 8, 1993 [CN] China .................. 93227250.9

[51] Int. Cl.$^6$ ...................................... B23Q 3/14
[52] U.S. Cl. .................. 269/48.1; 269/63; 279/2.12; 279/2.17
[58] Field of Search .................. 269/48.1, 63; 279/2.01, 279/2.1–2.12, 2.17, 2.22; 242/68.2, 72 R; 294/93, 96; 118/500; 51/403, 381

[56] References Cited

U.S. PATENT DOCUMENTS

| | | | |
|---|---|---|---|
| 2,960,342 | 11/1960 | Raper | 279/2.12 |
| 2,992,787 | 7/1961 | Craig | 279/2.17 |
| 4,712,720 | 12/1987 | Tesch | 279/2.22 |
| 4,916,792 | 4/1990 | Haubus | 269/48.1 |
| 5,012,566 | 5/1991 | Getz | 279/2.12 |
| 5,074,536 | 12/1991 | McConkey | 269/48.1 |

FOREIGN PATENT DOCUMENTS 88216959.9  7/1989  China .

*Primary Examiner*—Robert C. Watson
*Attorney, Agent, or Firm*—Collier, Shannon, Rill & Scott, PLLC

[57] ABSTRACT

A mandrel for use in processing a workpiece having an internal spline. The mandrel includes an expandable collet having an upper expandable spline-shaped portion and a lower portion with a groove adapted to receive two half-keys. Inside the expandable collet are a series of sleeves and steel balls. A bolt having a conical head and a nut hold the mandrel together. As the nut is tightened, the sleeves and balls cause the upper spline-shaped portion of the collet to expand to hold a workpiece having an internal spline. At the same time, the half-keys are forced apart in the key-way of an indexing rotary table to accurately position the mandrel on the table.

10 Claims, 2 Drawing Sheets

MANDREL FOR PROCESSING A WORKPIECE WITH AN INTERNAL SPLINE

BACKGROUND OF THE INVENTION

1. Field of the Invention

The invention relates to a mandrel. Specifically, the invention relates to a mandrel for processing a workpiece with an internal spline.

2. Description of the Background Art

The general technology in this art, such as Chinese Patent CN88216959.9 entitled "Internal Spline Side Grinder", herein incorporated by reference, uses a mandrel which is fixed to a rotary working table by two pieces of half-key, and clamp the workpiece with an elastic clack or snap clip. Such mandrels do not provide high positioning precision because only the upper section of a clack or snap clip contacts the workpiece. Also, prepositioning a workpiece is difficult which results in low efficiency because the lower section is often fixed by a conical handle without a positioning unit.

SUMMARY OF THE INVENTION

The mandrel of the present invention comprises an expandable spline collet and a bolt for positioning and locating of internal spline workpiece. The bolt has a conical head in the lower end. Two half-keys are separated by the conical head. In the preferred embodiment, a lower sleeve, a spring, steel balls, a sliding mid-sleeve, steel balls, an upper sliding sleeve, steel balls, and a nut assembled in that order are positioned inside the expandable spline collet. The two half-keys are installed in a lower groove of the expandable spline collet. The expandable spline collet body is split by at least one groove enabling it to expand when the nut is tightened against the upper sliding sleeve.

DETAILED DESCRIPTION OF THE INVENTION

The invention is a mandrel for processing a workpiece which has an internal spline with high precision and efficiency. The mandrel includes two half-keys separated by a bolt. The two half-keys are positional in a lower groove of an expandable spline collet. The bolt has a conical head at its lower end, within the lower portion of the spline collet. Also, within the a lower sleeve, a spring, steel balls, a sliding mid-sleeve, steel balls, an upper sleeve, steel balls, and a nut which are assembled in that order. A detailed explanation of the structure of the mandrel is provided in the Figures.

The expandable spline collet body is split by at least one groove which allows the upper spline-shaped portion of the collet to expand when the nut is tightened on the bolt.

Figure 1:
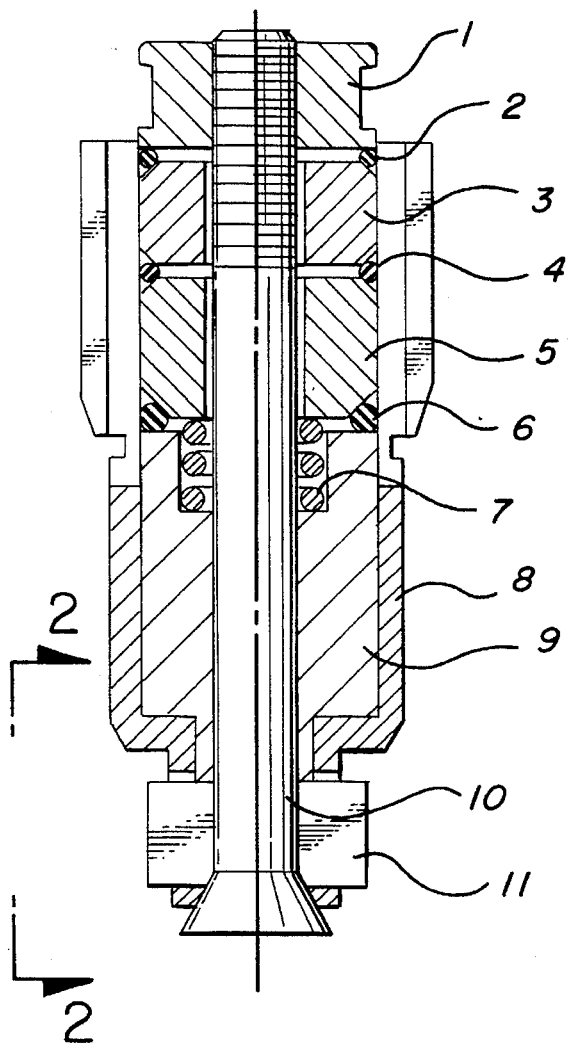
FIG. 1 illustrates a detailed cross-sectional view of the preferred embodiment of the mandrel of the invention.
Figure 2:
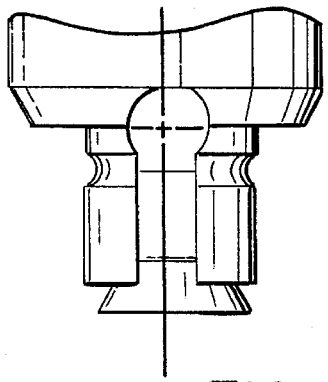
FIG. 2 illustrates a plan view of the half-keys of FIG. 1.
Figure 3:
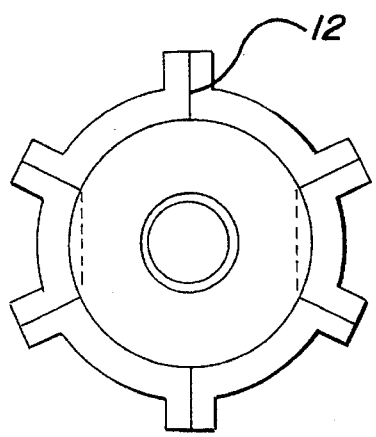
FIG. 3 illustrates a top plan view of the mandrel.
Figure 4:
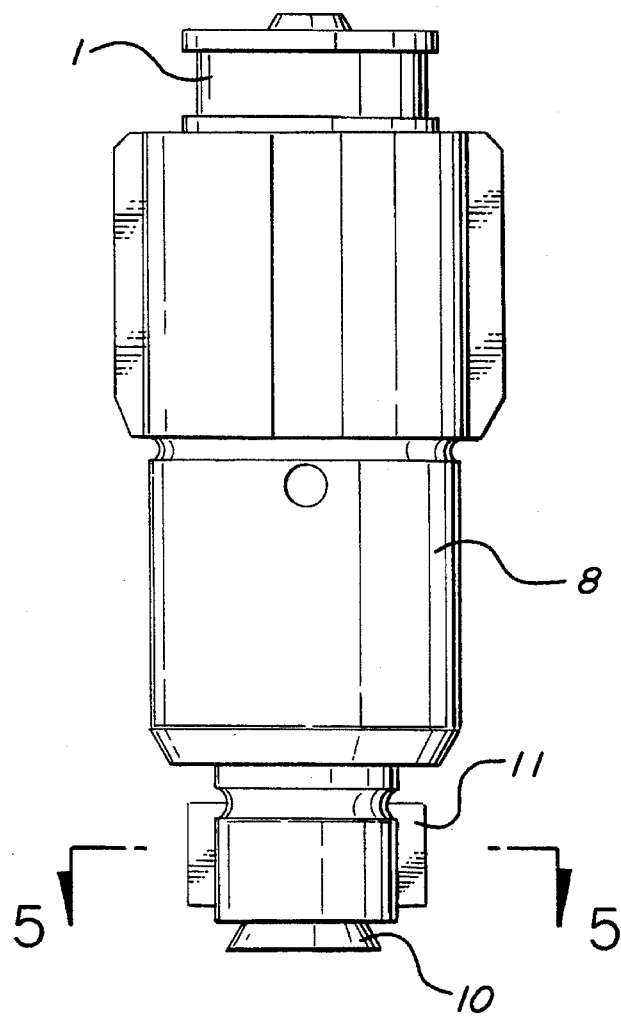
FIG. 4 illustrates a plan view of the assembled mandrel of FIG. 1.
Figure 5:
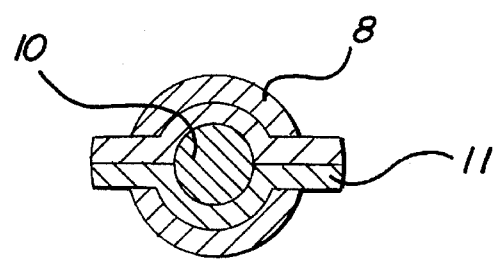
FIG. 5 illustrates a cross-sectional view of the half-keys of FIG. 2.

FIGS. 1–5 illustrate the expandable spline collet and half-key assembly of the invention. As seen in FIG. 1, expandable spline collet 8 is cylindrical having an upper half and a lower half. The upper half of collet 8 is spline-shaped. The spline-shaped upper portion of collet 8 is split by at least one and preferably several grooves 12 as illustrated in FIG. 3. The grooves allow the upper spline-shaped portion of collet 8 to expand. Bolt 10 is positioned inside expandable spline collet 8. Bolt 10 has an upper threaded end adapted to receive a nut 1, and a conical head at the other end. As seen in FIG. 2, a groove is formed in the lower portion of collet 8. This groove is adapted to receive two half-keys 11. Half-keys 11 are separated by the conical head of bolt 10.

A lower sleeve 9 is positioned inside the lower portion of collet 8. Sleeve 9 is cylindrical and has a lower conical extension that is adapted to lit between half-keys 11. Sleeve 9 has a partial bore in its upper surface that is adapted to seat spring 7. Sliding sleeve 5 is positioned above sleeve 9 inside the upper portion of collet 8. Sleeve 5 has chamfered upper and lower edges. Steel balls 6 are positioned between the lower surface of sleeve 5 and the upper surface of sleeve 9 in the groove formed by the chamfered lower edge of sleeve 5. Sliding sleeve 3 is positioned above sleeve 5 inside collet 8. Sliding sleeve 3 has chamfered upper an lower edges. Steel balls 4 are positioned between sleeve 5 and sleeve 3 in the groove formed by the chamfered upper edge of sleeve 5 and lower edge of sleeve 3. Nut 1 is positioned above sleeve 3 on bolt 10. Steel balls 2 are positioned between nut 1 and sleeve 3.

As nut 1 is rotated on the threaded end of bolt 10, it forces sleeve 3 against sleeve 5. Sleeve 5 is forced against sleeve 9, against the force of spring 7. As sleeves 3, 5, and 9 are force together, steel balls 2, 4, and 6 are forced against the inside surface of the upper portion of collet 8 due to the chamfered edges of the sleeves. Because the upper portion of collet 8 is split by several grooves, steel balls 2, 4, and 6 cause the upper portion of collet 8 to expand or open. At the same time, the conical head of bolt 10 and the conical lower extension of sleeve 9 are drawn together, forcing half-keys 11 to separate.

When nut 1 is rotated the opposite direction, spring 7 forces sleeves 3 and 5 away from sleeve 9. Steel balls 2, 4, and 6 recess into the grooves formed between the chamfered surfaces of the sleeves and the spline shaped upper portion of collet 8 closes or contracts. In addition, the distance between the conical head of bolt 10 and the conical lower extension of sleeve 9 is increased thereby allowing half-keys 11 to return to their original position.

In operation, the work piece is positioned on the upper spline shaped portion of collet 8. Collet 8 is then positioned on a rotary indexing work table. The lower section of collet 8, having two half-keys 11, is positioned in a slotted key-way of the indexing rotary work table. As nut 1 is tightened on bolt 10, sleeves 3, 5, and 9 are forced closer together against the biasing force of spring 7 as described above, causing the upper spline-shaped portion of collet 8 to expand against the internal spline surface of the workpiece, thereby tightening the workpiece to the mandrel. At the same time, hall-keys 11 are forced apart by the conical head of bolt 10 and the conical lower extension of sleeve 9, the lower portion of collet 8 is precisely and accurately located and locked in the key-way slot of the indexing table. As can be seen, the present invention provides an efficient and accurate clamping mechanism for a workpiece having an internal spline.

To release the mandrel and workpiece from the indexing table, nut 1 is turned in the opposite direction on bolt 10. This simultaneous relaxes the force exerted on the half-keys 11 and sleeves 3, 5, and 9. Half-keys 11 are released from the key-way of the indexing table. The upper spline-shaped expandable portion of collet 8 is relaxed and the workpiece can be removed from the mandrel. The present invention provides a convenient way to fix and separate a workpiece to a mandrel quickly yet with high precision. A high efficiency in production can be realized by using the mandrel according to the present invention.

I claim:

1. A mandrel for processing a workpiece with an internal spline comprising two half-keys separated by a bolt, said two half-keys being positioned in a groove formed on the lower portion of an expandable spline-shaped collet, said expandable spline-shaped collet further comprising an expanding sleeve.

2. The mandrel of claim 1 wherein said expanding sleeve comprises a lower sleeve, a sliding mid-sleeve, a sliding upper sleeve, and a nut, further wherein a spring is positioned between said lower sleeve and said mid-sleeve, and steel balls are positioned between the edges of said lower sleeve, said mid-sleeve, said upper sleeve, and said nut.

3. The mandrel of claim 1 wherein said expandable spline collet is split by at least one groove formed in an upper portion of said expandable spline-shaped collet.

4. A mandrel for processing a workpiece having an internal spline, said mandrel comprising:

an expandable collet having an upper portion and a lower portion;

an expanding sleeve within said expandable collet;

two half-keys positioned in a groove formed on said lower portion of said expandable collet; and a bolt having a conical head within said expandable collet, said bolt being adapted to separate said two half-keys and expand said expanding sleeve.

5. A mandrel according to claim 4 wherein said upper portion of said expandable collet has at least one spline formed thereon.

6. A mandrel according to claim 5 wherein said upper portion of said expandable collet has at least one groove in said spline.

7. A mandrel according to claim 4 wherein said expandable sleeve comprises a lower sleeve and a sliding upper sleeve separated by a spring and steel balls, further wherein said lower sleeve and said upper sleeve edges are chamfered.

8. A mandrel according to claim 7 wherein said sliding upper sleeve further comprises two sliding sleeve portions, each of said sliding sleeve portions being separated by steel balls.

9. A mandrel according to claim 4 wherein said nut and bolt is adapted to expand said expanding sleeve when said nut is tightened on said bolt.

10. A mandrel according to claim 4 wherein said nut and bolt is adapted to expand said half-keys apart when said nut is tightened on said bolt.

* * * * *